(12) United States Patent
Raju et al.

(10) Patent No.: US 12,181,974 B2
(45) Date of Patent: Dec. 31, 2024

(54) TECHNIQUES FOR PERIPHERAL UTILIZATION METRICS COLLECTION AND REPORTING

(71) Applicant: TEXAS INSTRUMENTS INCORPORATED, Dallas, TX (US)

(72) Inventors: Veeramanikandan Raju, Bengaluru (IN); Sudhakar Surendran, Bengaluru (IN); Anand Kumar G, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/563,398

(22) Filed: Dec. 28, 2021

(65) Prior Publication Data

US 2023/0102099 A1 Mar. 30, 2023

(30) Foreign Application Priority Data

Sep. 22, 2021 (IN) .............................. 202141042897

(51) Int. Cl.
*G06F 11/14* (2006.01)
*G06F 11/07* (2006.01)
(Continued)

(52) U.S. Cl.
CPC ...... *G06F 11/1441* (2013.01); *G06F 11/0772* (2013.01); *G06F 11/0793* (2013.01); *G06F 11/1417* (2013.01); *G06F 11/2205* (2013.01); *G06F 11/2247* (2013.01); *G06F 11/2284* (2013.01); *G06F 11/26* (2013.01); *G06F 11/3051* (2013.01); *G06F 11/3055* (2013.01); *G06F 11/3423* (2013.01);
(Continued)

(58) Field of Classification Search
CPC ............ G06F 11/1441; G06F 11/0772; G06F 11/0793; G06F 11/1417; G06F 11/2205; G06F 11/2247; G06F 11/2284; G06F 11/3051; G06F 11/3423; G06F 11/349; G06F 11/3688; G06F 13/1668; G06F 13/409; G06F 21/602; G06F 2221/0751; G06F 21/107; G06F 11/26; G06F 11/3055
See application file for complete search history.

(56) References Cited

U.S. PATENT DOCUMENTS

10,983,851 B1 * 4/2021 Djadi .................... G06F 1/3206
11,263,083 B1 * 3/2022 Lu ....................... G06F 11/1471
(Continued)

*Primary Examiner* — Bryce P Bonzo
*Assistant Examiner* — Michael Xu
(74) *Attorney, Agent, or Firm* — Xianghui Huang; Frank D. Cimino (57) ABSTRACT

This disclosure relates to an electronic device. The electronic device includes a non-transitory storage device, one or more peripherals, wherein the one or more peripherals are disabled, a processor configured to transmit a request to enable a peripheral of the one or more peripherals, and a power reset manager module. The power reset manager module is configured to receive the request to enable the peripheral. The power reset manager module includes a first memory configured to store, in response to the received request, an indication that peripheral was enabled. The processor is further configured to copy contents of the first memory to the non-transitory storage device and output the indication that the peripheral was enabled as a part of an update procedure.

19 Claims, 4 Drawing Sheets

(51) Int. Cl.
*G06F 11/22* (2006.01)
*G06F 11/26* (2006.01)
*G06F 11/30* (2006.01)
*G06F 11/34* (2006.01)
*G06F 11/36* (2006.01)
G06F 13/16 (2006.01)
G06F 13/40 (2006.01)
G06F 21/10 (2013.01)
G06F 21/60 (2013.01)

(52) U.S. Cl.
CPC ........ *G06F 11/349* (2013.01); *G06F 11/3688* (2013.01); *G06F 13/1668* (2013.01); *G06F 13/409* (2013.01); *G06F 21/107* (2023.08); *G06F 21/602* (2013.01)

(56) References Cited

U.S. PATENT DOCUMENTS

2005/0080597 A1* 4/2005 Blair .................... G06F 11/3051
702/188
2005/0180233 A1* 8/2005 Das ...................... G11C 7/1063
365/202
2005/0182859 A1* 8/2005 Das ........................ G06F 13/28
710/8
2006/0005004 A1* 1/2006 First .................... G06F 11/1441
713/2
2006/0294353 A1* 12/2006 Rothman ............ G06F 11/0766
713/1
2014/0280815 A1* 9/2014 Candelaria .............. G06F 9/226
709/223
2017/0031671 A1* 2/2017 Joshi ................... G06F 11/1469
2017/0242758 A1* 8/2017 Chou ................... G06F 11/0793
2018/0059756 A1* 3/2018 Gallimore ............. G06F 15/163
2019/0138479 A1* 5/2019 Srivastava .......... G06F 11/3024
2019/0227876 A1* 7/2019 Dardis ...................... G06F 8/71
2020/0088794 A1* 3/2020 Nakanishi ........... G06F 11/3051
2021/0232474 A1* 7/2021 Zotto .................. G06F 11/3075
2021/0286692 A1* 9/2021 Chien ................. G06F 11/2284
2022/0147410 A1* 5/2022 Gopalakrishnan .... G06F 11/079
2022/0269565 A1* 8/2022 Chou .................. G06F 11/1417

* cited by examiner

TECHNIQUES FOR PERIPHERAL UTILIZATION METRICS COLLECTION AND REPORTING

CROSS-REFERENCE TO RELATED APPLICATION

This application claims priority to India Provisional Application No. 202141042897, filed Sep. 22, 2021, which is hereby incorporated by reference.

BACKGROUND

As a part of producing complex integrated circuit (ICs) systems such as a microcontroller, an embedded circuit, a system-on-chip (SoC), etc., the IC may be operationally and/or functionally tested. Such testing may be performed after the silicon wafer is processed to produce individual ICs and prior to being sent to users. In existing systems this testing is performed on every peripheral of the IC being produced. Complex ICs can include many peripherals which can significantly increase test complexity and an amount of time to run the tests, which in turn increases the cost of the testing. Generally, a peripheral may provide connectivity, services, and/or interfaces for a processor. Examples of peripherals include, but are not limited to, universal serial bus (USB), multimedia card (MMC), display connectivity, timers, analog to digital converters, graphics processing unit or other image processing hardware, sensors, PCI express (PCIe) interface, etc. In some cases, a processor and a number of peripherals may be integrated together on a single chip, for example, on a SoC.

In practice, many users of these ICs do not utilize all of the peripherals available in an IC design. For example, a user of an IC may utilize a number of sensors, timers, and certain processors, but may not use the image processing hardware. To help reduce production costs for the IC, it may be desirable to reduce or eliminate operational and/or functionality testing for peripherals of an IC the user will not be using. Reducing the operational and/or functionality testing costs may help reduce the overall cost of the IC without incurring additional design change costs. Techniques for peripheral utilization metrics collection and reporting may be used to help determine which peripherals the user uses.

SUMMARY

This disclosure relates to an electronic device. The electronic device includes a non-transitory storage device, one or more peripherals, wherein the one or more peripherals are disabled, a processor configured to transmit a request to enable a peripheral of the one or more peripherals, and a power reset manager module. The power reset manager module is configured to receive the request to enable the peripheral. The power reset manager module includes a first memory configured to store, in response to the received request, an indication that peripheral was enabled. The processor is further configured to copy contents of the first memory to the non-transitory storage device and output the indication that the peripheral was enabled as a part of an update procedure.

Another aspect of the present disclosure relates to a technique including receiving a request to enable a peripheral of an electronic circuit. The technique further includes storing, in a first memory, an indication that the peripheral was enabled. The technique also includes copying contents of the first memory to a non-transitory storage device. The technique further includes outputting, from the non-transitory storage device, the indication that the peripheral was enabled as a part of an update procedure.

Another aspect of the present disclosure relates to a circuit. The circuit includes a power reset manager module configured to receive a request to enable the peripheral. The power reset manager module includes a first register configured to store, in response to the received request to enable the peripheral, an indication that the peripheral was enabled. The first register is configured to receive a request to copy contents of the first register to a non-transitory storage device and output the indication that the peripheral was enabled.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Complex ICs are widely used, or embedded, in a variety of devices. These embedded systems may include one or more processors, such as a microcontroller, digital signal processor, etc., along with devices, such as a cache controller, various peripheral devices for interfacing with analog sensors, hardware accelerators, and other circuitry that performs desired functions. As an example, a vehicle such as a car may include many embedded ICs within it for operating various components, such as infotainment systems, engine/motor controllers, braking systems, etc. Often, an embedded system is designed to perform a defined set of functions that does not change substantially. For example, a car braking system generally will have a defined functionality, such as monitoring brake performance, avoiding locking up the brakes, etc., and the braking system will not be configured/reconfigured, for example, to perform infotainment functionality. In many cases, the defined functionality will not need to utilize all of the capabilities and peripherals of the embedded system. As the defined functionality is unlikely to change substantially, the capabilities and peripherals used by the embedded system are also unlikely to change substantially. To help reduce a cost of such embedded systems, the peripherals used by such systems may be determined to help allow operational and/or functionality testing for the unused peripherals to be eliminated or reduced.

Figure 1:
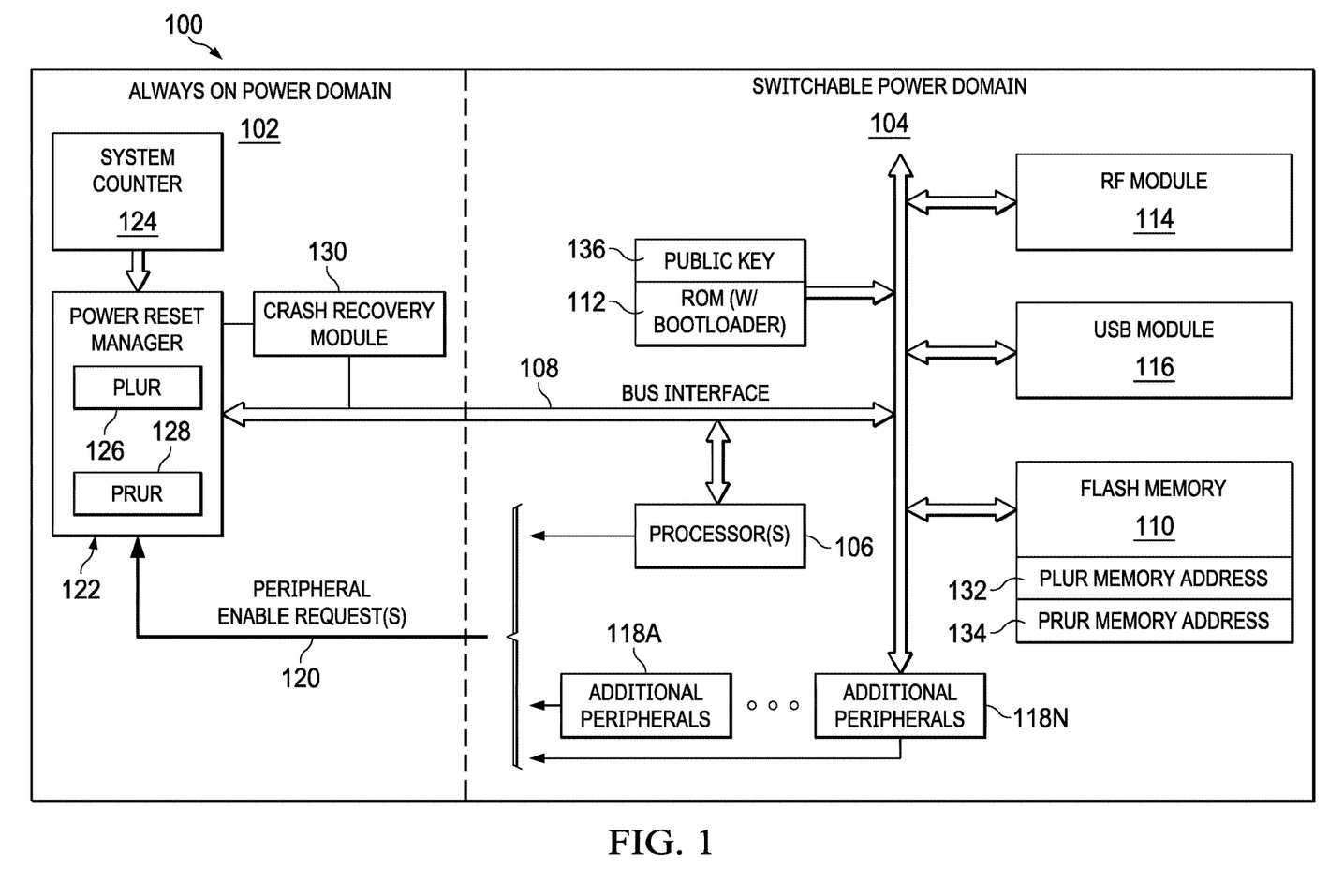
FIG. 1 is a block diagram of an example IC configured to collect and report peripheral utilization metrics, in accordance with aspects of the present disclosure.

FIG. 1 is a block diagram of an example IC 100 configured to collect and report peripheral utilization metrics, in accordance with aspects of the present disclosure. As shown, the IC 100 includes two power domains, an always-on power domain 102 and a switchable power domain 104. The always-on power domain 102 includes components which do not enter a low-power state, while the switchable power domain 104 includes components which may enter a low power state. For examples, components in the always-on power domain 102 may remain powered on during a sleep and/or standby mode, and through reboot/reset cycles, while components in the switchable power domain 104 may be powered down (e.g., in a relatively low power state).

In this example, the switchable power domain 104 includes one or more processors 106 coupled to a bus interface (e.g., interconnect, crossbar, etc.) 108. The bus interface 108 interconnects and routes data between various components of the device. In some cases, the bus interface 108 may be a memory controller or any other circuit that can provide an interconnect between peripherals. Peripherals may include host peripherals (e.g., components that access memory, the one or more processors 106, processor packages, direct memory access (DMA)/input output components, etc.) and target peripherals (e.g., memory components, such as flash memory 110, read only memory (ROM) 112, double data rate (DDR) random access memory (not shown), other types of random access memory, DMA/input output components, etc.).

The ROM 112 may include a bootloader which includes a program that is used to start the IC 100 and load an operating system (if used). Other peripherals coupled to the bus interface 108 in this example include a radio frequency (RF) module 114, which may be used to provide a connection to one or more wireless networks, a universal serial bus (USB) module 116, which may be used to connect other devices, and additional peripherals 118A . . . 118N.

In some cases, peripherals may be initially disabled until they are used. In this example, the additional peripherals 118A . . . 118N may be initially disabled. Peripherals which are disabled may be in a relatively low power state. For example, the disabled peripherals may be clock or power gated and this gating may be removed when a disabled peripheral is enabled. Peripherals may be enabled as needed, for example, upon initialization by an application program executing on the one or more processor(s). As a part of enabling a peripheral, a peripheral enable request 120 may be sent to a power reset manager 122 in the always-on power domain 102. In some cases, the peripheral enable request 120 may be received from the peripheral 118 and/or the one or more processors 106.

The always-on power domain 102 includes a system counter 124 and the power reset manager 122. The system counter 124 may be a free running counter which is started when the IC 100 is power cycled (e.g., powered on, booted, started, hard reset, etc.). For example, the system counter 124 may be an accumulator which continuously increments on each clock pulse until a maximum value is reached, at which the system counter 124 may reset to the initial value and continue incrementing. The system counter 124 may continuously increment until the IC 100 is turned off and/or power-cycled.

In this example, the system counter 124 is coupled to the power reset manager 122. The power reset manager 122 controls which peripherals are enabled. For example, the power reset manager 122 may clock gate or otherwise power down peripherals which are disabled and remove the clock gate for or otherwise power up peripherals that are enabled. As a part of controlling which peripherals are enabled, the power reset manager 122 receives peripheral enable requests 120 and has information on which peripherals are enabled/disabled. In this example, the power reset manager 122 includes two registers (but may have additional registers as well), a peripheral lifetime usage register (PLUR) 126 and a peripheral real-time usage register (PRUR) 128. The PLUR 126 and the PRUR 128 may include a number of bits based on a number of peripherals of the IC 100. For example, the PLUR 126 and the PRUR 128 may include a separate bit to represent each peripheral. In some cases, certain peripherals may be enabled by default, such as for a processor, ROM, etc., and bits representing those peripherals may be omitted from the PLUR 126 and the PRUR 128.

The PLUR 126 may track whether a particular peripheral of the IC 100 has ever been enabled for use. As indicated above, the power reset manager 122 receives a peripheral enable request 120 as a part of enabling a peripheral. When the peripheral enable request 120 is received, a bit corresponding to the peripheral may be set to indicate that the peripheral has been enabled. If the corresponding bit of the PLUR 126 indicates that the peripheral was previously enabled, then the corresponding bit may remain set. In some examples, the power reset manager 122 only records a peripheral as being enabled in the PLUR 126 if the peripheral was enabled in a functional capacity as opposed to a test capacity or an idle capacity.

The PRUR 128 may provide an indication as to what peripherals of the IC 100 are enabled at a given point in time. As indicated above, the power reset manager 122 is coupled to the system counter 124 and the PRUR 128 may be configured to capture information on what peripherals are active based on the system counter 124. For example, the PRUR 128 may be configured to periodically capture information on what peripherals are active. This capture period may be configured, for example, via user programming, in the ROM, etc.

The always-on power domain 102 may also include a crash recovery module 130 which may be configured, for example via hardware programming or software, to reboot the IC 100 when a crash or other failure is detected. As a part of the crash recovery software routine, the contents of the PLUR 126 may be written into a PLUR memory address 132 of flash memory 110 or other suitable memory designated for storing the contents of the PLUR 126 and the contents of the PRUR 128 may be written into a PRUR memory address 134 of flash memory 110 or other suitable memory designated for storing the contents of the PRUR 128. In this example, the flash memory 110 may be a non-volatile storage device. In some cases, the contents of the PLUR 126 and PRUR 128 may be stored until the next reboot cycle where the contents may be overwritten.

In some cases, the data stored in the PLUR memory address 132 and PRUR memory address 134 may be accessed for reporting. For example, during an update process via the RF module 114, USB module 116, ethernet module (not shown), removeable storage (not shown), and/or other module which may provide connectivity and/or storage, the contents of the PLUR memory address 132 and PRUR memory address 134 may be accessed and encrypted based on an encryption key, such as public key 136. The update process may be a process by which firmware/flash/software of the IC 100 is accessed to be updated/changed/modified, etc. The encryption key may be stored in ROM 112. This encrypted information may be transmitted to a manufacturer and/or developer of the IC 100, for example, as a part of the update process. The encrypted information may be transmitted (e.g., sent to) via the module used to connect to the IC 100, such as the RF module 114, USB module 116, and/or other module. For example, if an update process is initiated via the USB module 116, the encrypted information may be transmitted to the USB module 116 as a part of the update process. As another example, the contents of the PLUR 126 and PRUR 128 may be accessed as a part of a debug process. In some applications, information related to which peripherals of the IC 100 are in use or have ever been used may be considered private and/or confidential information and accordingly, some examples only obtain such information with the user's informed consent so that the user has knowledge of and may determine whether such information may be used and examples may take steps, such as encryption, to safeguard the information. For example, the manufacturer and/or developer may inform a user that such information may be collected and allow the user to determine whether such information may be provided to the manufacturer/developer. The IC 100 may verify that the user has consented to reporting of this information prior to providing it to the manufacturer/developer.

After the encrypted information is received by the manufacturer/developer, the encrypted information may be decrypted. For example, where the encrypted information is encrypted using a public key of the manufacturer/developer, the manufacturer/developer may use their private key to decrypt the encrypted information. Based on the information indicating which peripherals of the IC 100 are in use, the manufacturer/developer may be able to adjust the operational/functionality test regime for ICs 100 destined for the user. For example, full operational/functionality testing may be performed for peripherals that were enabled and reduced may be performed (or no testing at all) for peripherals that were not enabled. In some cases, this test regime optimization may be specific to a particular user and/or specific to a particular application of the IC for the user.

Figure 2A:
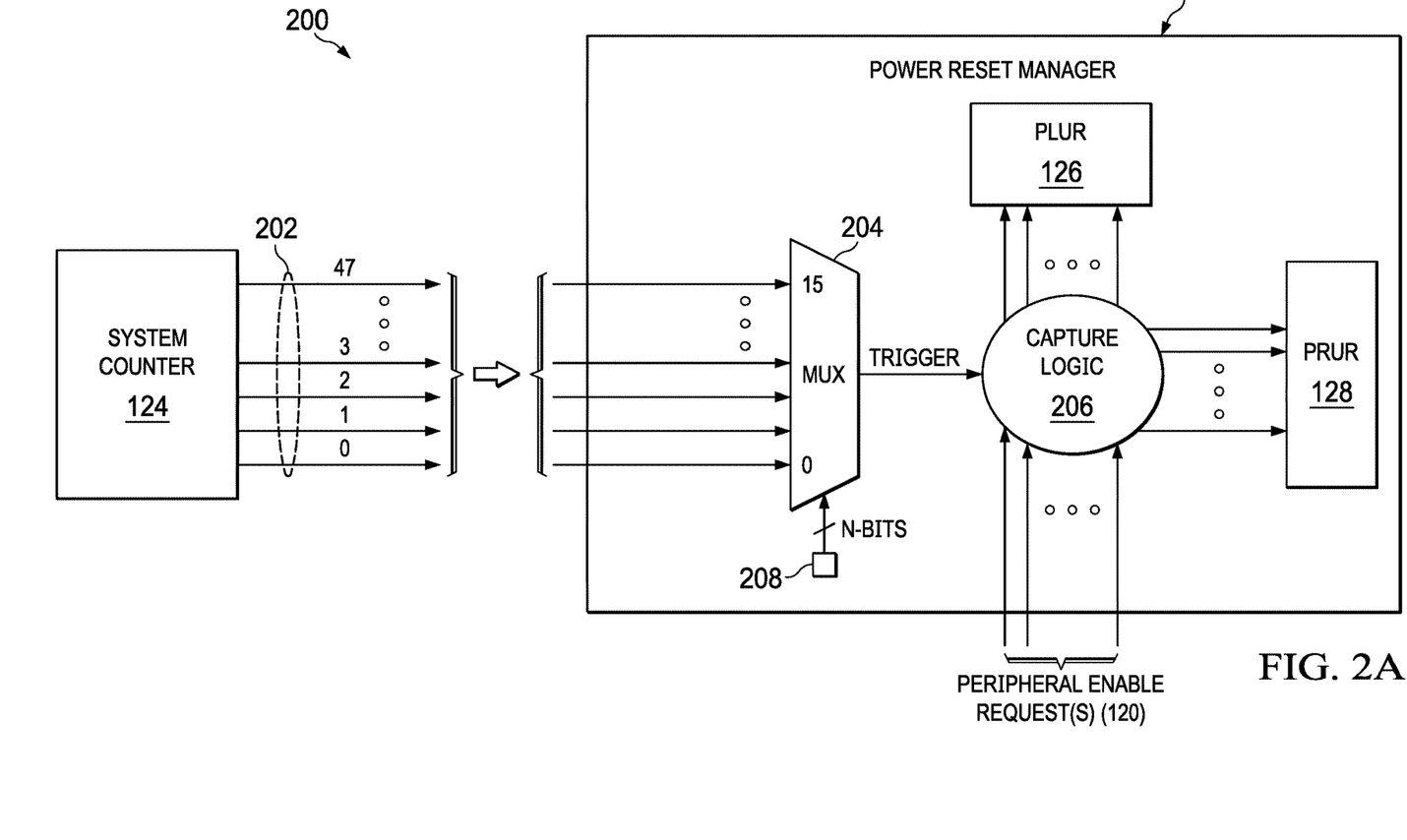
FIG. 2A is a block diagram illustrating components for peripheral utilization metrics collection and reporting, in accordance with aspects of the present disclosure.

FIG. 2A is a block diagram 200 illustrating components for peripheral utilization metrics collection and reporting, in accordance with aspects of the present disclosure. Diagram 200 includes details for the system counter 124 and the power reset manager 122. In this example, the system counter 124 may include multiple output lines 202 that together output a binary number. This binary number may indicate the amount of time that has passed since the IC was power cycled. For example, the system counter 124 may have a microsecond resolution and the system counter 124 may be incremented each microsecond. Then the binary number output by the system counter 124 indicates a number of microseconds since the IC was power cycled. In this example, the binary number is a 48-bit number which can represent multiple years' worth of microseconds. In some cases, the output lines 202 may be incorporated on a system bus (not shown) and the output of the system counter distributed to various components of the IC.

In some cases, the output of the system counter 124 may be received by a multiplexer (mux) 204 of the power reset manager 122. The mux 204 may be coupled to any number of the output lines 202 based on a range of time resolutions. This range of time resolutions may be determined, for example, during the design of the power reset manager 122. The mux 204 is shown coupled to a capture logic 206 of the power reset manager 122. The mux 204 may be configured to transmit an indication to the capture logic 206 to capture a snapshot of the peripherals currently enabled for the IC. For example, the mux 204 may receive, on a select line 208 a N number of bits indicating a rate (e.g., value) to transmit the indication to capture the snapshot to the capture logic 206.

Figure 2B:
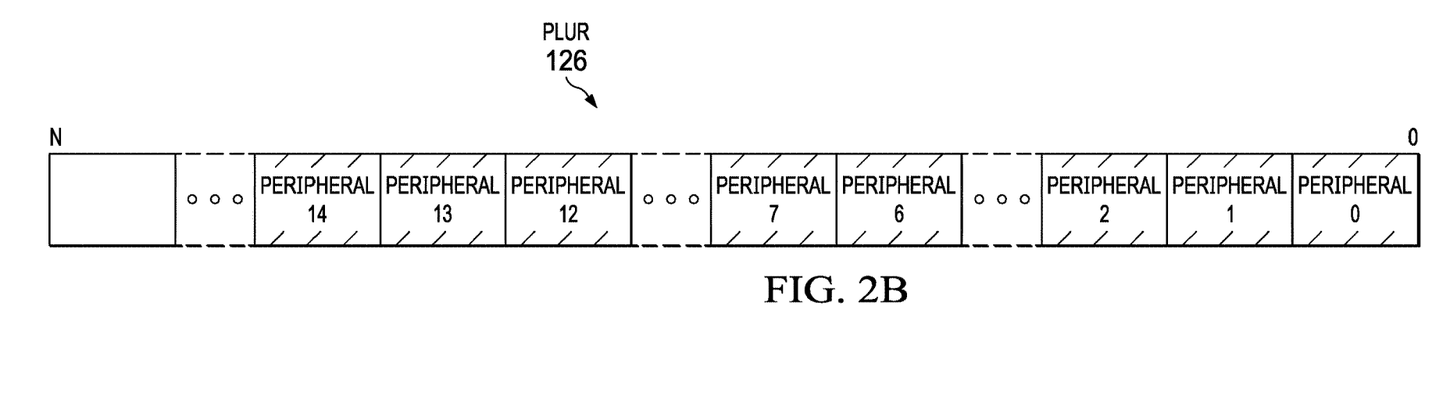
FIGS. 2B-2C illustrate the contents of registers, in accordance with aspects of the present disclosure.

The capture logic 206 receives peripheral enable requests 120 and observes which peripherals are enabled. The capture logic 206 may forward the peripheral enable request 120 to other components of the power reset manager 122 to enable the requested peripherals and may receive requests to disable peripherals (not shown). When a peripheral enable request 120 is received, the capture logic 206 may send an indication to the PLUR 126 to set a bit corresponding to the peripheral in the PLUR 126. As shown in FIG. 2B, the PLUR 126 may include N number of bits, where the bits correspond to peripherals of the IC. When the indication that a peripheral is being enabled is received from the capture logic 206, the bit corresponding to the peripheral in the PLUR 126 may be set. In this example, bits corresponding to peripherals 0-2, 6, 7, and 12-14 are set indicating that those peripherals have been enabled at some point. The bits of the PLUR 126 may be sticky in that once the bit is set to indicate that the corresponding peripheral has been enabled, that bit may stay set until next power-on reset. For example, the register may include latches that do not have a reset line or a sticky flop.

Figure 2C:
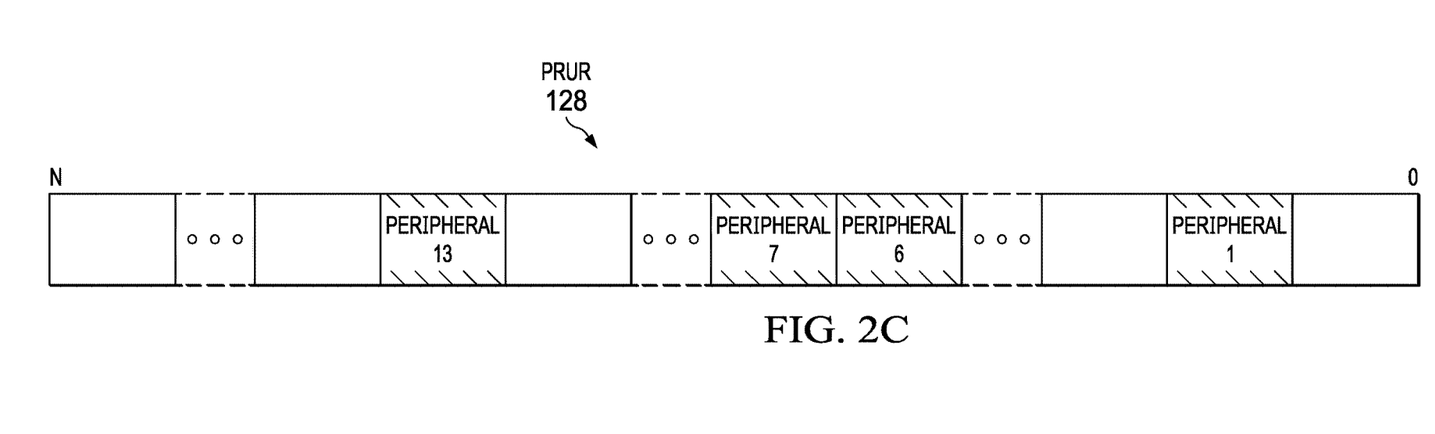

The capture logic 206, upon receiving the indication to capture the snapshot from the mux 204, may forward an indication of which peripherals are currently enabled to the PRUR 128. As shown in FIG. 2C, the PRUR 128 may include N number of bits, where the bits correspond to peripherals of the IC. When the indication of which peripherals are currently enabled is received by the PRUR 128, the existing contents of the PRUR 128 may be cleared and bits corresponding to the peripherals that are currently enabled may be set in the PRUR 128. In this example, bits corresponding to peripherals 1, 6-7, and 13 are set. As the bits set in the PRUR 128 represent the peripherals that are currently enabled while the bits set in the PLUR 126 represents the peripherals that have ever been enabled, the bits set in the PRUR 128 are necessarily a subset of the bits set in the PLUR 126.

In some cases, information indicating which peripherals have been enabled and which peripherals have never been enabled may be used to help reduce a boot time of an IC. For example, during a boot (e.g., startup) process for the IC a set of self-tests may be performed for peripherals of the IC. Often these self-tests cover at least a substantial portion, if not all, of the peripherals of the IC. In some cases, the boot procedure may be adjusted to access the PLUR memory address to determine which peripherals of the IC have not been enabled. Self-tests associated with peripherals that have not been enabled may then be omitted from the boot process.

In some cases, peripheral usage information may be output for debugging. For example, a debugging application may be executing on the processor and the debugging application may access the contents of the PLUR and PRUR. The debugging application may also access the system counter information to help obtain time information that may be associated with the PLUR and PRUR information. The debugging application may output the contents of the PLUR and PRUR, for example, via a debug trace port, USB module, or other communications port. In some cases, time information may also be provided along with the contents of the PLUR and PRUR. In some cases, the rate at which snapshots of which peripherals are currently enabled may be dynamically adjusted, for example, by the debugging application by adjusting the value received by mux 204 on the select line 208. This dynamic adjustment may help increase an amount of information captured during relevant points during debugging, while reducing the amount of information captured during less relevant points.

Figure 3:
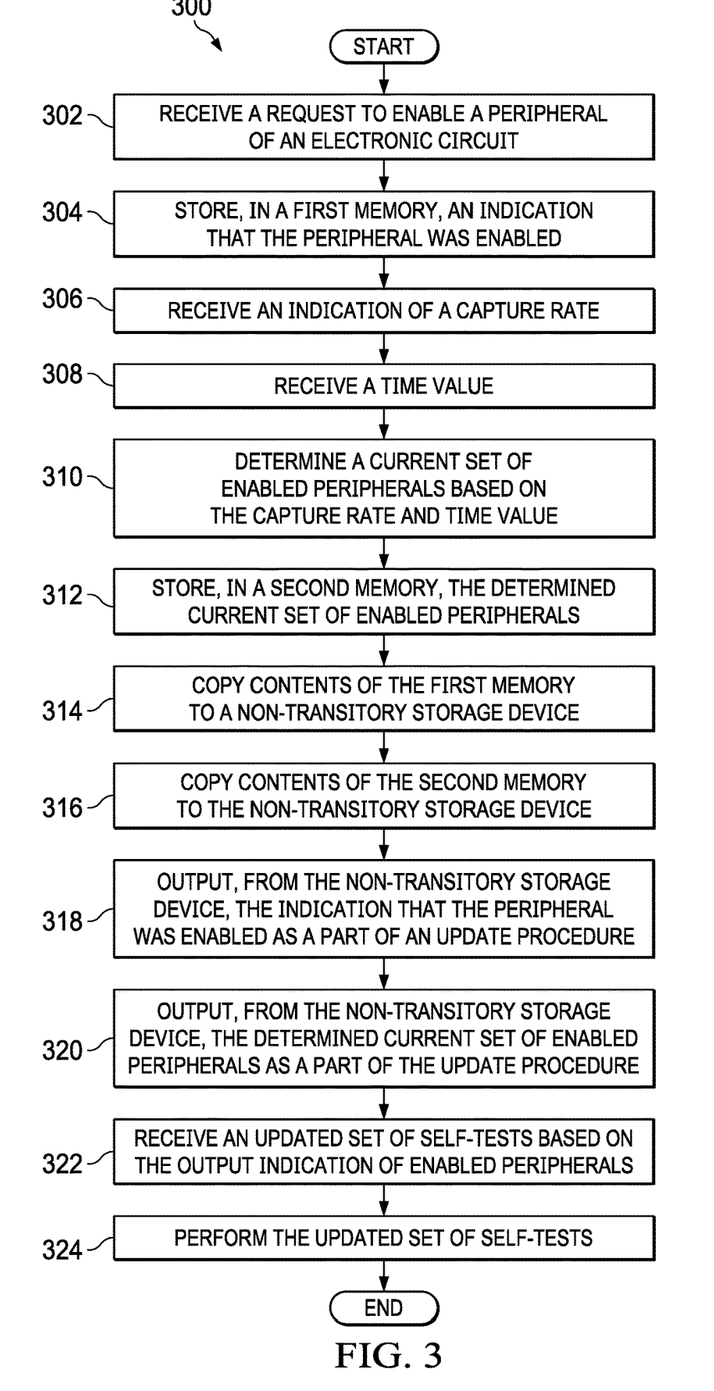
FIG. 3 is a flow diagram illustrating a technique for peripheral utilization metrics collection and reporting, in accordance with aspects of the present disclosure.

FIG. 3 is a flow diagram 300 illustrating a technique for peripheral utilization metrics collection and reporting, in accordance with aspects of the present disclosure. At block 302, a request to enable a peripheral of an electronic circuit is received. For example, an IC, such as a SoC, microcontroller, etc., may include one or more peripherals which are deactivated until they are needed. For example, a program executing on the IC may invoke/initialize a peripheral and the corresponding peripheral may be enabled. As a part of enabling a peripheral, a request to enable the peripheral may be generated, for example, by a processor executing the program. The request to enable the peripheral may be received, for example, by a power reset manager of the IC. The power reset manager of the IC may be configured to enable/disable peripherals of the IC and may observe the status of peripherals of the IC.

At block 304, an indication that the peripheral was enabled is stored in a first memory. For example, an indication that the peripheral may be stored in a first register, such as a PLUR. In some cases, the first register may include a number of bits corresponding with a number of peripherals which may be enabled/disabled. The bits may then represent a specific peripheral and setting the bit to a certain value may indicate that the peripheral has been enabled at some point. In some cases, the bits are sticky such that once a value indicating that the peripheral has been enabled is set, the value persists.

In some cases, at block 306, an indication of a capture rate may be received and, at block 308, a time value may be received. For example, the power reset manager may be coupled to a system counter. The system counter 124 may output a continuously incrementing time value. In some cases, the power reset manager may receive the system counter value via a mux (e.g., mux 204). The mux may receive, on the select line, a value indicating a rate of the time value at which the power reset manager may capture information related to which peripherals are currently enabled for the IC. In this example, at block 310, a current set of enabled peripherals is determined based on the capture rate and time value. For example, the power reset manager may observe the peripherals which are enabled. At the time values indicated the power reset manager may output the information indicating which peripherals are currently enabled. Optionally, at block 312, the determined current set of enabled peripherals is stored in a second memory. For example, the output information indicating which peripherals are currently enabled may be received by and copied into a second memory. In some cases, the second memory may be a second register, such as a PRUR. In some cases, the second register may include a number of bits corresponding with a number of peripherals which may be enabled/disabled. The bits may then represent a specific peripheral and setting the bit to a certain value may indicate that the peripheral is currently (e.g., at the time of the snapshot) enabled.

At block 314, the contents of the first memory are copied to a non-transitory storage device. For example, during an update process and/or debug process, the contents of the PLUR may be copied to a non-transitory memory, such as flash memory, hard disk, etc. In some cases, the contents of the PLUR may be copied to the non-transitory memory as a part of a crash recovery procedure. In some cases, copying may include merging the contents of the PLUR with information in the non-transitory memory. For example, as the PLUR records whether a peripheral has ever been enabled, merging the contents of the PLUR may copy those bits indicating that the corresponding peripheral has been enabled, while ignoring the bits indicating that the corresponding peripheral was not enabled. In some cases, the contents of the PLUR may be copied to a designated location of the non-transitory memory. In this example, at block 316, the contents of the second memory are also copied to the non-transitory storage device. This copying may be performed as a part of an update and/or debug process, as well as a part of a crash recovery procedure. In some cases, the contents of the PRUR may be copied to a designated location of the non-transitory memory.

At block 318, the indication that the peripheral was enabled is output, from the non-transitory storage device as a part of an update procedure. For example, during the update procedure, the contents of the portion of the non-transitory memory containing information as to which peripherals where enabled may be output. In some cases, the information may be encrypted. In some cases, the encryption may be based on a public key. At block 320, the determined current set of enabled peripherals are output from the non-transitory storage device as a part of the update procedure. For example, during the update procedure, the contents of the portion of the non-transitory memory containing information on the current set of enabled peripherals may be output. At block 322, an updated set of self-tests are received, the updated set of self-tests are based on the output indication of enabled peripherals. For example, where the output determined current set of enabled peripherals indicates that a certain peripheral has never been used, a determination may be made to disable a self-test associated with that peripheral. The updated set of self-tests may reflect this disabled self-test. At block 324, the updated set of self-tests are performed.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Circuits described herein are reconfigurable to include additional or different components to provide functionality at least partially similar to functionality available prior to the component replacement. Modifications are possible in the described examples, and other examples are possible within the scope of the claims.

What is claimed is:
1. An electronic device comprising:
a non-transitory storage device;
a peripheral;
a processor configured to transmit a request to enable the peripheral;
a system counter configured to transmit a time value; and
a power reset manager module configured to:
receive the request to enable the peripheral;
store, in response to the received request, a value in a first memory to indicate that the peripheral was enabled;

remain the value in the first memory at a subsequent disablement of the peripheral;
receive an indication of a capture rate;
receive the time value;
determine a current set of enabled peripherals based on the capture rate and time value; and
store, in a second memory, the determined current set of enabled peripherals,
wherein the processor is further configured to copy contents of the first memory and contents of the second memory to the non-transitory storage device.

2. The electronic device of claim 1, wherein the first memory and the second memory comprise registers.

3. The electronic device of claim 1, wherein the processor is configured to encrypt the value and the determined current set of enabled peripherals based on a public key.

4. The electronic device of claim 3, wherein the encrypting is performed as a part of an update procedure, and wherein the processor is further configured to generate an output indicating that the peripheral was enabled as a part of the update procedure.

5. The electronic device of claim 1, wherein the electronic device further comprises:
a crash recovery module configured to:
access the first memory to obtain information indicating which peripherals were enabled;
access the second memory to obtain the determined current set of enabled peripherals;
store the information indicating which peripherals were enabled and the determined current set of enabled peripherals to the non-transitory storage device; and
reset the electronic device.

6. The electronic device of claim 5, wherein the power reset manager module and the crash recovery module remain powered during the reset.

7. A method comprising:
receiving, at a power reset manager module of an electronic device, a request to enable a peripheral of an electronic circuit;
in response to receiving the request, storing, by the power reset manager module, in a first memory, a value to indicate that the peripheral was enabled, wherein the value is remained at a subsequent disablement of the peripheral;
receiving an indication of a capture rate;
receiving a time value;
determining a current set of enabled peripherals based on the capture rate and time value;
storing, in a second memory, the determined current set of enabled peripherals;
copying contents of the first memory and contents of the second memory to a non-transitory storage device; and
generating, based on the copied contents of the non-transitory storage device, an output indicating that the peripheral was enabled and the determined current set of enabled peripherals as a part of an update procedure.

8. The method of claim 7, wherein the power reset manager module remains powered during reset of the electronic device.

9. The method of claim 7, wherein storing the value indicating that the peripheral was enabled comprising storing the value indicating that the peripheral was enabled in a first register, and wherein storing the determined current set of enabled peripherals comprises storing the determined current set of enabled peripherals in a second register.

10. The method of claim 7, further comprising encrypting the value and the determined current set of enabled peripherals based on a public key.

11. The method of claim 10, wherein the encrypting is performed as a part of the update procedure.

12. The method of claim 7, further comprising:
accessing the first memory to obtain information indicating which peripherals were enabled;
storing the information indicating which peripherals were enabled to the non-transitory storage device; and
resetting the electronic circuit.

13. The method of claim 12, further comprising:
retrieving the information indicating which peripherals were enabled during a startup process; and
determining a set of peripherals to test during the startup process based on the retrieved information indicating which peripherals were enabled.

14. A circuit comprising:
a power reset manager module configured to:
receive a request to enable a peripheral of an electronic circuit;
set, in response to the received request, a bit value in a first register to indicate that the peripheral was enabled;
keep the bit value set in the first register at a subsequent disablement of the peripheral;
receive an indication of a capture rate;
receive a time value;
determine a current set of enabled peripherals based on the capture rate and time value;
store, in a second register, the determined current set of enabled peripherals;
receive a request of contents of the first register and contents of the second register; and
provide the bit value of the first register and the determined current set of enabled peripherals of the second register in response to the request.

15. The circuit of claim 14, wherein the power reset manager module remains powered during reset of the circuit.

16. The circuit of claim 14, further comprising a processor, wherein the processor is configured to encrypt the bit value and the determined current set of enabled peripherals based on a public key.

17. The circuit of claim 16, wherein the encrypting is performed as a part of an update procedure.

18. The circuit of claim 14, wherein the power reset manager module is configured to provide the bit value as a part of a debug procedure, and provide the determined current set of enabled peripherals as a part of an update procedure or as a part of the debug procedure.

19. The circuit of claim 14, further comprising a crash recovery module configured to:
access the first register to obtain information indicating which peripherals were enabled;
access the second register to obtain the determined current set of enabled peripherals;
store the information indicating which peripherals were enabled and the determined current set of enabled peripherals to a non-transitory storage device; and
generate a signal to reset the electronic circuit.

* * * * *